No. 795,113. PATENTED JULY 18, 1905.
G. GELATT.
HUB BRAKE.
APPLICATION FILED OCT. 1, 1904.

WITNESSES:
L. B. Gelatt
C. M. Spencer

INVENTOR:
George Gelatt
BY
R. W. Nesb. ATTY.

No. 795,113.

Patented July 18, 1905.

UNITED STATES PATENT OFFICE.

GEORGE GELATT, OF SCRANTON, PENNSYLVANIA.

HUB-BRAKE.

SPECIFICATION forming part of Letters Patent No. 795,113, dated July 18, 1905.

Application filed October 1, 1904. Serial No. 226,777.

*To all whom it may concern:*

Be it known that I, GEORGE GELATT, a citizen of the United States, residing at Scranton, in the county of Lackawanna and State of Pennsylvania, have invented new and useful Improvements in Hub-Brakes, of which the following is a specification.

My invention relates to certain new and useful improvements in hub-brakes having for its object a device of this type which embodies novel means for applying the braking power equally on the hub portions of the front wheels.

Further, my invention contemplates application of the braking power in descending grades and the like in proportion to the power or pressure applied on the pole by the draft-animals.

Further, I propose to permit backing of the vehicle without application of the braking means, all of which will be specifically referred to presently.

With the above and other objects in view my invention has for its further object simplicity in construction, the elimination of as many parts as is possible, and economical manufacture.

Figure 1:
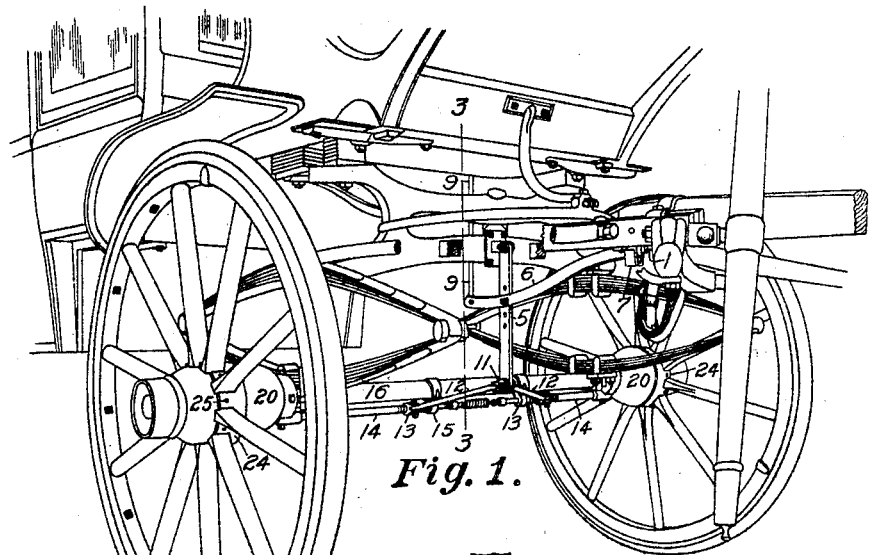
Figures 2, 3, 4:
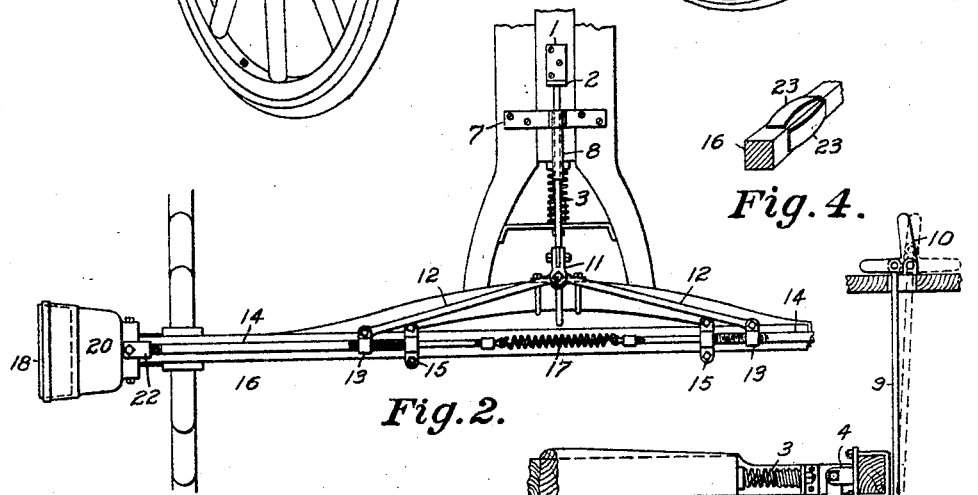
Figures 5, 6:
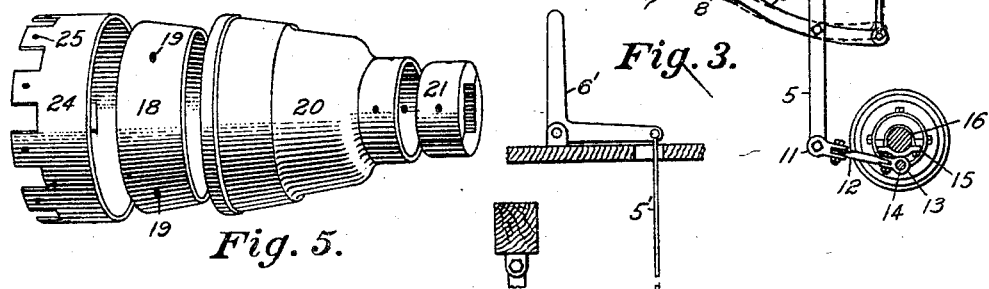

Referring to the accompanying drawings, forming a part of this application, and wherein like numerals of reference indicate similiar parts throughout the several views, Figure 1 is a view in perspective, showing my improved device applied to a carriage. Fig. 2 is a bottom plan view of the same. Fig. 3 is a sectional view taken on line 3 3 of Fig. 1. Fig. 4 is a perspective view of a portion of the axle, showing the springs on which the slidable cylinders are mounted. Fig. 5 is a view showing the braking-cylinders, slidable collar, and the dust or mud guards; and Fig. 6 is a modification in elevation, illustrating my improved brake adapted for use by foot-power.

In equipping a vehicle with my improved device I secure to the pole of the same adjacent the rear end thereof and on its bottom face a plate 1, having a downwardly-extending right-angular rear end 2. Preferably the pole is mounted as shown in Fig. 3 of the drawings, wherein a spring 3 is employed retained between the end of the pole and the bolster for the purpose of returning the pole to normal or outward position after actuation of the same in descending grades. Pivotally suspended from the said bolster by means of a fitting 4 is a vertically-extending lever 5, to which is pivotally connected a rod or plunger 6, the forward portion of which is confined within a guide 7, formed sufficiently deep for the purpose of permitting downward movement of said forward portion of the plunger to allow the same to escape engagement with the end 2 of plate 1 when the pole is assuming its innermost position for the purpose of backing the vehicle. A spring 8 of flat form, as shown in Fig. 3, is employed to retain plunger 6 in its uppermost position, this spring being secured to guide 7 at its one end and at its opposite end bearing against the curved part of the plunger. The rear end of plunger 6 is pivoted to a rod 9, the latter extending vertically and through the floor of the vehicle at the driver's seat, being equipped with an operating member 10, enabling actuation of the rod 9 in a vertical plane to raise the rear end of the plunger and depress the forward end of the same, allowing, as above stated, the end 2 of plate 1 to pass said forward end of the plunger without engaging the same.

Connected to the lower end of lever 5 is a fitting 11, which is connected to the inner ends of a pair of rods 12, the outer ends of which each are pivoted to clevises 13, mounted adjustably on the rods 14, said rods 14 being threaded for this purpose. Guides 15 are employed for the purpose of retaining rods 14 in normal position, these guides being secured to the axle 16. To the inner ends of rods 14 I secure a spring 17 for the purpose of retracting the said rods and retaining the same in inoperative position, at which time the braking-cylinders are out of engagement. By reason of this spring being interposed between the rods it will be manifest that the rods will be returned to normal position simultaneously.

As shown in Fig. 5 of the drawings, I provide bands 18, formed with perforations 19 for the purpose of receiving fastening means whereby the said bands may be secured to the hubs of the wheels adjacent the inner ends of the same. These bands are formed with a taper, as illustrated, and are engaged by the braking-cylinders 20, likewise tapered, the latter at their inner ends being formed with a contracted portion of circular contour providing a sleeve receiving the axle-collar 21, the latter being preferably constructed in two parts, enabling the same to be placed over the axle and received in said sleeve of the braking-cylinders. Both the braking-cylinder and the axle-collar have apertures for the reception of fastening means to secure the two parts in relation to each other. As shown, the interior of the axle-collar is of square contour, enabling the same to be moved along the axle, but not to rotate thereon. A fitting 22 is employed to connect the braking-cylinders and the rods 14. If desired, the slidable axle-collars may be engaged by flat springs 23 on the interior of the same, as shown in Fig. 4, preventing any rattling or noise. For the purpose of preventing the ingress of dust, mud, or the like a guard 24 is preferably employed, which is secured to the hub portion of the wheels by suitable fastenings passed through apertures 25, this guard extending over the braking-cylinders and forming a joint in connection therewith, thus preventing the entrance of extraneous substances, which will hinder the perfect operation of the device.

In operation it will be observed that in descending grades and the like the pressure exerted by the draft-animals on the pole will have a tendency to thrust the same rearwardly, thus bringing the plate 2 into engagement with plunger 6, which movement causes said plunger to have a like movement, and by virtue of the connection between said plunger and lever 5 the latter will be likewise thrown rearwardly, thereby causing rods 12, which are connected to rods 14, to throw the latter outwardly and away from each other, enabling the braking-cylinders to engage the bands 18. It will be observed that the degree of movement of the braking-cylinders will be equal to the extent of movement of the pole due to the intervening mechanism, and as the movement of the pole is only to the extent of pressure exerted by the draft-animals, consequently the application of the braking power will be in proportion to such pressure, which is a desideratum, inasmuch as the amount of braking power to be applied should be in proportion to the degree of the grade. Upon release of rearward pressure on the pole the spring 3 will return the latter to normal position, and interposed spring 17 will create a like effect on the rods 14, thus restoring all parts to inoperative position. Should it be desirable that the vehicle be backed, it is necessary that rod 9 be moved upwardly through the medium of operating member 10, thus depressing the forward end of plunger 6 against the action of spring 8 and permitting the pole to move rearwardly without the plate 1 thereof engaging said plunger, thus not bringing the parts of the braking mechanism into operation and allowing the vehicle to be backed, as desired. Upon rod 9 assuming its normal position the return of plunger 6 will be assisted by the presence of spring 8, as will be manifest.

In Fig. 6 of the drawings I have illustrated a modification of my invention wherein the device is adaptable for use with foot-power and without the intervention of automatic means. In this construction all parts are the same with the exception of the means for creating outward movement of the braking-cylinders through the medium of the intermediate mechanism and now to be distinguished. A foot-lever 6' is pivoted to the floor of the vehicle within reach of the operator or driver and further pivoted to a lever 5', extending vertically and connected to a chain or strap 2' at its lower end. This chain passes over a pulley 21, retained in relation to the axle by means of a clip 20', and is secured at its opposite end to fitting 11', corresponding to fitting 11 in the other form of the invention previously described. By forward pressure on the lever 6' it will be seen that lever 5' will be raised, causing the chain 2' to move fitting 11' so as to spread the arms to which the brake-cylinders are connected. It will be observed that this form of the invention may be used in conjunction with vehicles regardless of the motive power, not being limited to that class drawn by draft-animals, as is the case in the previously-described form of the invention.

Having thus fully described my invention, what I claim as new, and desire to secure by Letters Patent, is—

1. In a device of the type set forth, rods carrying braking-cylinders on their one ends and having a spring interposed between their other ends, a lever connected to each of the said rods, a plunger connected to said lever, for actuation by the vehicle-pole, and means whereby the plunger may be thrown out of engagement with said pole.

2. In a device of the type set forth, rods carrying braking means, means for actuating said rods, a plunger for actuating said first-named means, said plunger being actuated by the pole of the vehicle, and means for raising the rear end of said plunger so as to disengage the front end thereof from said pole.

3. In a device of the type set forth, braking means, means for actuating said means, a plunger for actuating said means, said plunger being operated by the vehicle-pole, and means for depressing said plunger out of engagement with said pole.

4. In a device of the type set forth, braking means, a lever having connection with said means, a plunger pivoted to said lever, and adapted for actuation by the vehicle-pole, and means for disengaging said plunger from said pole.

5. In a device of the type set forth, braking means, rods connected thereto and having a spring interposed between the inner ends thereof, rods connected to said first-named rods, a lever connected to said last-named rods, and means for actuating said lever.

6. In a device of the type set forth, braking means, a lever connected to said means, a plunger pivoted intermediate its length to said lever, and means for raising the rear end of the plunger so as to depress the forward end of the same.

7. In combination with the braking means of the vehicle, and the means for operating the same, a vertically-disposed lever for actuating the operating means, and a horizontally-disposed plunger extending on opposite sides of said lever and being actuated by the vehicle-pole for operating said lever.

8. In combination with the braking means of the vehicle, and the means for operating the same, a plunger for actuating said means, said plunger having its one end normally in engagement with the vehicle-pole, and having means connected to its opposite end for disengaging said first-named end from the pole.

9. In combination with the pole, the braking means and the lever for actuating the same, a plunger operated by said pole and extending on opposite sides of said lever for actuating the latter.

10. In a device of the type set forth, rods carrying braking means and having a retractile spring interposed between their inner ends, a rod adjustably connected to each of said first-named rods, a vertically-extending lever having its upper end pivotally mounted and its lower end connected to each of said second-named rods, and means for actuating said lever.

In testimony whereof I affix my signature in presence of two subscribing witnesses.

GEORGE GELATT.

Witnesses:
M. J. RUDDY,
HARRY C. HUBLER.